Feb. 28, 1956 F. A. THAHELD 2,736,137
WIND MACHINE
Filed May 25, 1953 2 Sheets-Sheet 2
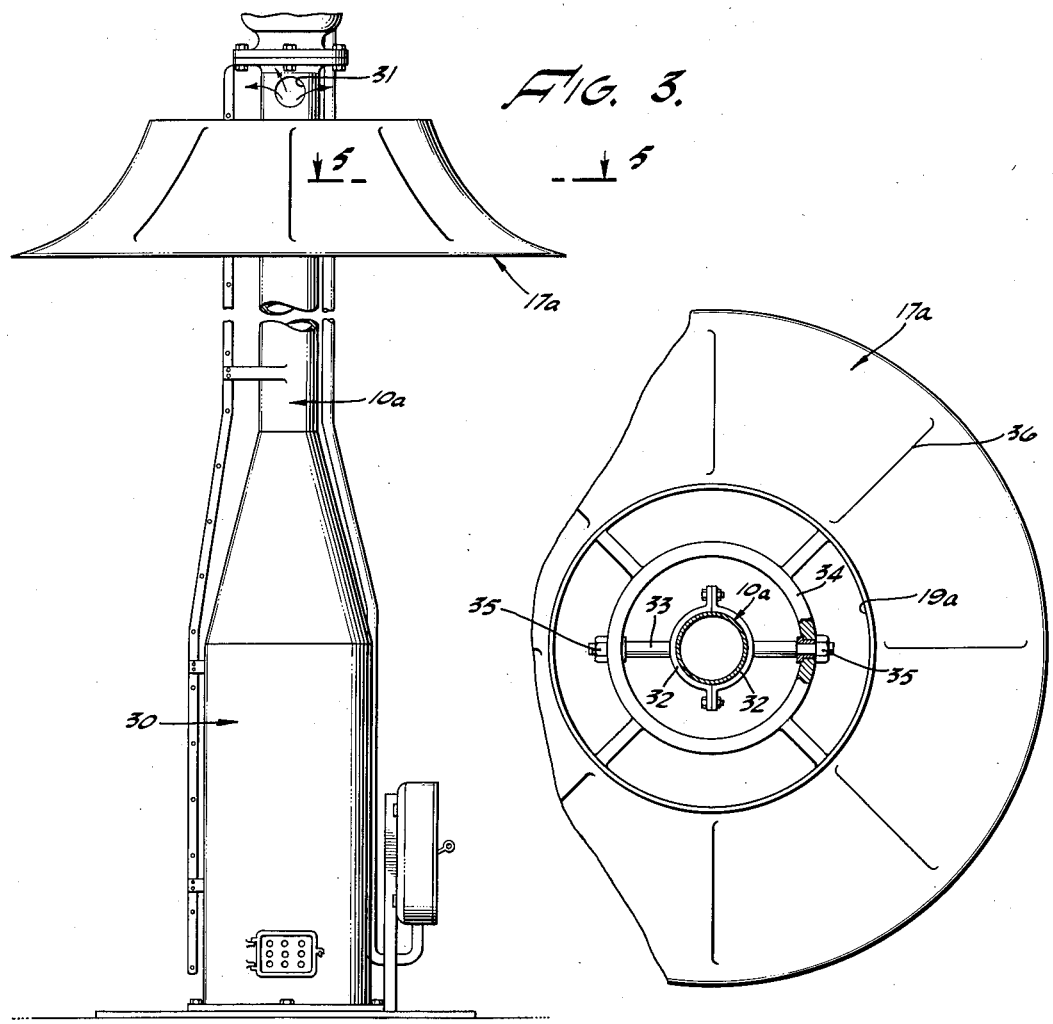
FIG. 3.
FIG. 4.
FIG. 6.
FRED A. THAHELD
INVENTOR.
BY 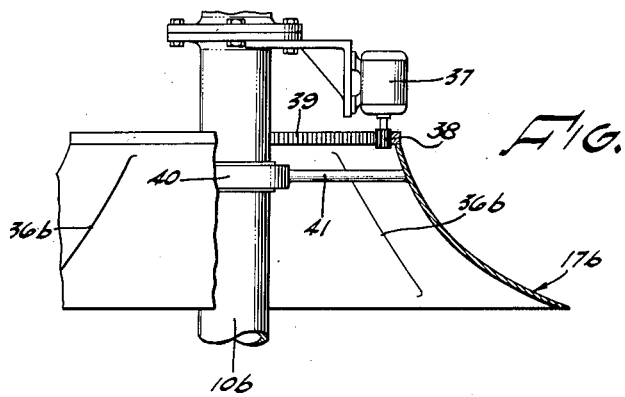
ATTORNEYS United States Patent Office 2,736,137
Patented Feb. 28, 1956

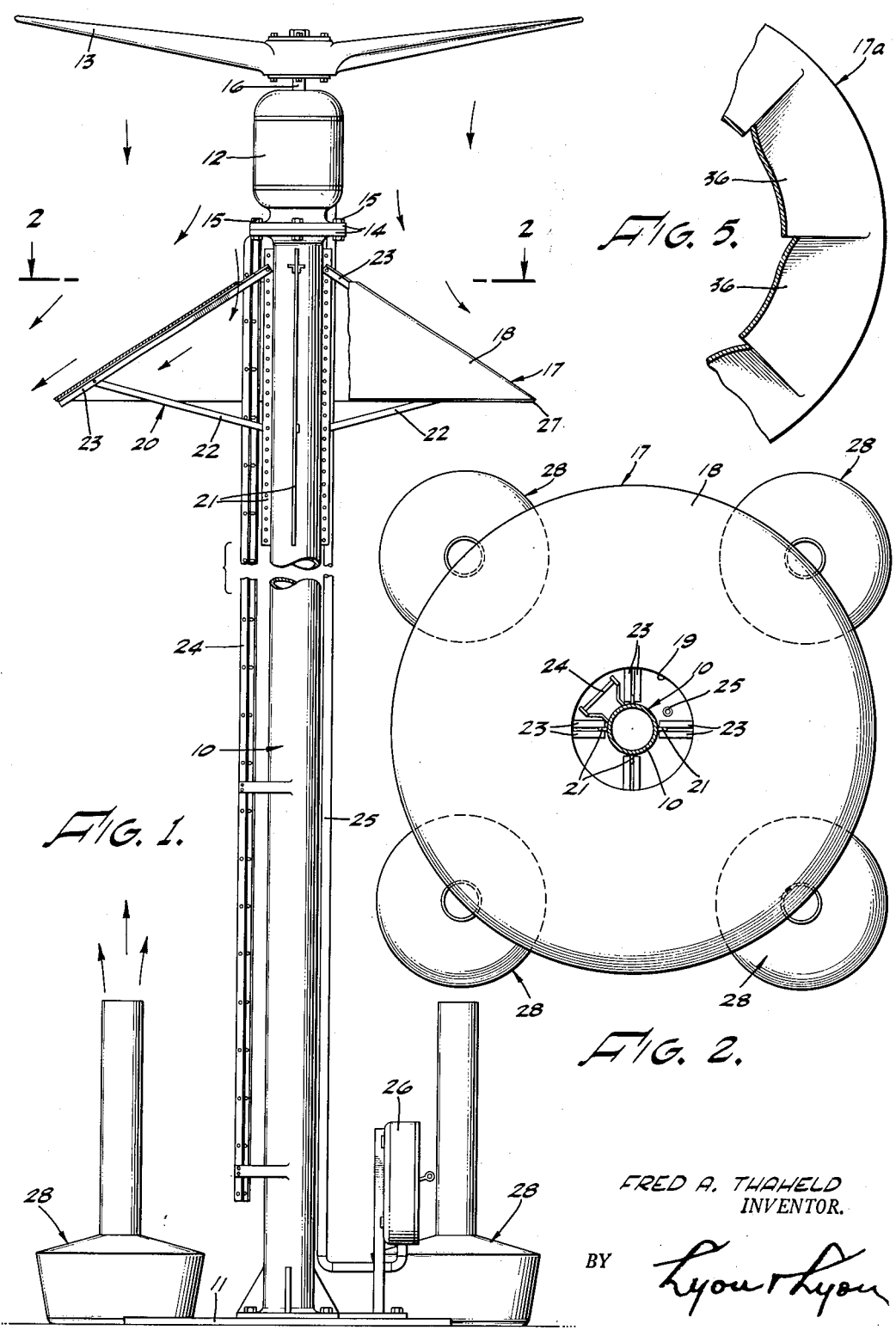

2,736,137
WIND MACHINE
Fred A. Thaheld, Brea, Calif., assignor to Diesel Power, Inc., Los Angeles, Calif., a corporation of Pennsylvania
Application May 25, 1953, Serial No. 357,322
5 Claims. (Cl. 47—2)

This invention relates to wind machines of the general type used for minimizing frost damage in the growing of fruits and vegetables. This invention has found particular usefulness in the prevention of frost damage in citrus groves.

Wind machines of the type now in use commonly provide a power driven propeller which is mounted on a tower and which rotates around a horizontal or slightly inclined axis. Such a device moves air substantially horizontally. The difficulty with this conventional form of wind machine is that the air blast from the propeller must move at very high velocity in order that any appreciable movement of air may be effected at the maximum distance from the tower. The force of such a blast, however, is frequently so strong as to damage trees immediately adjacent the tower. Furthermore, conventional wind machines ordinarily provide means for revolving the power unit and propeller slowly about a vertical axis so that the air blast from the propeller sweeps over the entire orchard or field in one revolution.

In accordance with my invention I provide a novel form of wind machine for minimizing frost damage to fruits and vegetables which is effective over a wide area and which does not subject the trees closely adjacent the device to air blasts of objectionable force. Furthermore, the device embodying my invention eliminates the requirement of means for revolving the power unit and propeller for progressive sweeping of the area with a horizontal current of air. I provide a power driven air moving unit at the upper end of the tower and this unit includes a propeller which turns about a substantially vertical axis so that a blast of air is directed vertically downward. I mount a deflector on the tower at a location below the propeller to deflect and divert the air stream and cause it to flow downward and outward from the tower in every direction simultaneously. In this way a flow of air radially outward is achieved throughout a complete circle and the intensity of the blast is not sufficiently high to cause damage to trees nearest the tower.

Another feature of my invention resides in the construction of the deflector which promotes efficiency of movement of the air by substantially eliminating objectionable turbulence on the outer circumference of the deflector. Other and more detailed objects and advantages will appear hereinafter.

In the drawings:

Figure 1 is a side elevation partly in section showing a preferred embodiment of my invention.

Figure 2 is a plan view taken substantially on the lines 2—2 as shown in Figure 1.

Figure 3 is a side elevation showing a modified form of my invention.

Figure 4 is a sectional plan view showing a portion of the device illustrated in Figure 3.

Figure 5 is a sectional detail taken substantially on the lines 5—5 as shown in Figure 3.

Figure 6 is a sectional elevation showing a further modification.

Referring to the drawings:

The tower or support generally designated 10 may comprise a length of vertical pipe or casing mounted on a suitable base 11. A prime mover 12 may be mounted on the upper end of the tower 10, and connected to drive the air screw or propeller 13 about a substantially vertical axis. The prime mover 12 may conveniently take the form of an electric motor having a housing connected to the tower 10 by means of the flanges 14 and threaded connections 15. The propeller 13 may be conveniently connected to the upwardly projecting motor shaft 16.

An air deflector 17 is supported on the tower 10 at a location below the propeller 13 and is shaped to deflect and divert the downward air blast from the propeller 13. As shown in Figures 1 and 2, this deflector 17 may constitute a frusto-conical element 18 having a central opening 19 and mounted upon an adjustable framework 20. This framework 20 may include a plurality of vertical rails 21 each having a vertical series of holes and each fixed relative to the tower 10. Inclined struts 22 serve to connect the rails 21 with the inclined bars 23. The upper ends of the bars 23 may be fixed to the rails 21. Suitable connection fittings are provided for connecting rails 21, struts 22 and bars 23. The construction and mounting of the deflector 17 enables it to be fixed to the tower in any one of several different vertical positions. Furthermore, the deflector may be tilted or canted in any desired direction in order to change the pattern of air flowing outwardly from the tower as described hereinbelow.

A ladder 24 may be mounted on the tower, if desired, in order to permit access to the deflector 17 or the prime mover 12. A conduit 25 contains electric power cable for operating the motor and the lower end of the conduit connects with a switch box 26 containing the usual starting coils, fuses, switch contacts, etc.

When the motor is energized to turn the propeller 13, an air blast is directed downward against the conical surface of the deflector 17 thereby deflecting the air downward and outward. Part of the downward blast of air from the propeller passes through the central opening 19 in the deflector and the air thus admitted into the space under the deflector is effective to minimize turbulence at the lower circumferential lip 27 on the extreme outer periphery of the deflector 17. If the device is used in a citrus grove on the side of a hill, the deflector 17 may be canted so that the lower edge thereof is inclined in the same direction as the hill. In this way the air flowing outward from the deflector has more uniform action on the grove uphill and downhill from the tower.

A plurality of orchard heaters 28 of any suitable or desirable type may be mounted below the deflector 17 near the base of the tower 10. The hot air from these orchard heaters 28 passes upwardly along the tower and then is drawn outward by a Venturi action adjacent the peripheral lip 27. The heat is thus imparted to the air leaving the upper surface of the deflector 17.

In the modified form of my invention shown in Figures 3, 4, and 5, the orchard heaters are eliminated and instead a central heating unit 30 is built into the lower portion of the tower 10a. The heated air passes upwardly through the interior of the tower and issues through lateral ports 31 which are located in the vicinity of the deflector 17a and below the propeller.

The deflector 17a is provided with a central opening 19a and is secured to the tower 10a by means of clamps 32 having oppositely extending arms 33. The arms are pivotally connected to the central ring 34. The deflector 17a can, therefore, be tilted in any direction by first loosening the clamps 32 to permit swinging of the arms 33 to the desired position and then by tilting the ring 34 with respect to the arms 33. Clamping nuts 35 may be provided for maintaining the deflector 17a in the desired tilted position.

The deflector 17a is not frusto-conical but curved in cross section and furthermore the dished shape may be interrupted by leaf sections or petals 36, as best shown in Figure 5, which tend to counteract the swirling effect of the downward blast of air from the propeller. It will be understood that either form of deflector 17 or 17a can be employed with either form of tower 10 or 10a.

In Figure 6 there is diagrammatically shown mechanism for rotating a deflector 17b relative to the tower 10b. The deflector 17b is similar to the deflector 17a just described and incorporates a series of dished petals or leaves 36b. The small motor 37 turns a pinion gear 38 which meshes with an internal ring gear 39 provided on the deflector 17b. The direction of rotation of the deflector 17b is preferably opposite to the direction of rotation of the propeller, in order to minimize swirling movement of the downward moving air. In some locations, however, the vortex action caused by the swirling action may actually be beneficial, and in such instances the deflector 17b is turned in the same direction as the propeller, and the petals 36b are disposed to promote the swirling action, rather than resisting it. The deflector 17b is supported on the tower 10b by means of a bearing assembly 40 and radiating arms 41.

It is a well-known fact that any rotary fan or propeller designed to move air in the direction of its axis, causes the air in the vicinity of blades to at least partially rotate about that axis. The thus rotating air responds to centrifugal force and moves away from the axis in addition to moving axially and thus may even cause some reverse flow near the axis. However, surrounding air limits the spread of the blown air outwardly and actually causes the axially moving stream to spread inwardly toward the axis. Due to this phenomenon, the deflectors of Figs. 1 and 3 must be sufficiently far below their respective propellers that the openings 19 and 19a are at a level where the downwardly blown stream of air has spread inwardly substantially to at least the central support 10 or 10a. This spacing is necessary to insure that some of the blown air enters the space below the deflector for the purpose previously described.

Having fully described my invention, it is to be understood that I do not wish to be limited to the details herein set forth, but my invention is of the full scope of the appended claims.

I claim:

1. In a wind machine for use out of doors, the combination of: an upright support, a power-driven rotary propeller mounted on the support for rotation about a substantially vertical axis and adapted to blow air downward, a deflector encircling the support below the propeller for directing the air outwardly away from the support, the deflector being curved in cross section and having a series of dished petals terminating in a continuous circular outer lip, the deflector having a central opening to permit downward passage of air between the deflector and the support to minimize turbulence adjacent said outer lip, said deflector being sufficiently far below said propeller that some of the air therefrom enters between said deflector and support, and means for mounting the deflector upon the support.

2. In a wind machine for use out of doors, the combination of: an upright support, a power-driven rotary propeller mounted on the support for rotation about a substantially vertical axis and adapted to blow air downward, and a deflector encircling the support below the propeller for directing the major portion of the air outwardly away from the support, the deflector having a central opening therethrough of greater radial dimension than the adjacent portion of said support and being positioned sufficiently far below said propeller that the open passageway defined by said opening receives some of said downwardly blown air moving along said support to admit the same to the space below said deflector, the space below the said opening and deflector being laterally unobstructed.

3. In a wind machine for use out of doors, the combination of: an upright support, a power-driven rotary propeller mounted on the support for rotation about a substantially vertical axis and adapted to blow air downward, a deflector encircling the support below the propeller for directing the air outwardly away from the support, said deflector having a central opening therethrough of greater radial dimension than the adjacent portion of said support whereby to leave an open passageway for some of said downwardly blown air to move along said support to the space below said deflector, said deflector being sufficiently far below said propeller that some of the air therefrom enters between said deflector and support, air heating means within the interior of the support, and ports in the support above the deflector for delivery of heated air to the atmosphere.

4. In a wind machine for use out of doors, the combination of: an upright support, a power-driven rotary propeller mounted on the support for rotation about a substantially vertical axis and adapted to blow air downward, a deflector encircling the support below the propeller but spaced outwardly from the support for directing the major portion of the air outwardly away from the support while permitting some of the air to pass between the deflector and support to the space below the deflector, said deflector being sufficiently far below said propeller that some of the air therefrom enters between said deflector and support, means pivotally mounting said deflector on said support about a horizontal axis, and means releasably holding said deflector in a selected position of angular adjustment about said horizontal axis, the space below said deflector and opening being laterally unobstructed.

5. A wind machine as defined in claim 2 wherein said deflector is a downwardly flared generally conical member, means mounting said deflector on said support, said means comprising a plurality of circumferentially spaced mounting devices, each of said devices having a vertical series of attachment elements, spaced supporting elements at the upper end of said deflector engaging selected ones of said attachment elements, and spaced holding members secured to said deflector at the lower end thereof, said holding members extending inwardly to said support and engaging selected ones of said attachment elements.

References Cited in the file of this patent

UNITED STATES PATENTS

| Number | Name | Date |
| --- | --- | --- |
| 1,499,894 | Waterman | July 1, 1924 |
| 1,926,795 | Sassenberg | Sept. 12, 1933 |
| 2,142,134 | Kurth | Jan. 3, 1939 |
| 2,165,148 | Nelson | July 4, 1939 |
| 2,362,955 | Cantwell | Nov. 14, 1944 |
| 2,369,303 | Kurth | Feb. 13, 1945 |
| 2,457,934 | Spieth | Jan. 4, 1949 |
| 2,529,339 | Irvine | Nov. 7, 1950 |
| 2,552,236 | Trane | May 8, 1951 |
| 2,661,068 | Gaskill | Dec. 1, 1953 |